United States Patent
Fujiwara et al.

(10) Patent No.: US 7,635,039 B2
(45) Date of Patent: Dec. 22, 2009

(54) SERIES HYBRID ELECTRIC VEHICLE

(75) Inventors: Kenji Fujiwara, Hyogo (JP); Takatoshi Kogure, Hyogo (JP); Tutomu Baba, Hyogo (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 539 days.

(21) Appl. No.: 10/597,143

(22) PCT Filed: Jan. 11, 2005

(86) PCT No.: PCT/JP2005/000189

§ 371 (c)(1), (2), (4) Date: Jul. 12, 2006

(87) PCT Pub. No.: WO2005/068244

PCT Pub. Date: Jul. 28, 2005

(65) Prior Publication Data
US 2007/0137908 A1    Jun. 21, 2007

(30) Foreign Application Priority Data
Jan. 13, 2004    (JP) ............................. 2004-006047

(51) Int. Cl.
*B60K 6/00*    (2007.10)
(52) U.S. Cl. .............................. 180/65.21; 180/65.275; 180/65.31
(58) Field of Classification Search .................. 180/65.1, 180/65.21, 65.275, 65.28, 65.31, 65.51, 65.5; 322/16, 39; 318/140
See application file for complete search history.

(56) References Cited

U.S. PATENT DOCUMENTS 4,358,696 A    11/1982 Liu (Continued)

FOREIGN PATENT DOCUMENTS

JP    51127410 A    11/1976

(Continued)

*Primary Examiner*—Glenn Dayoan
*Assistant Examiner*—Brian Swenson
(74) *Attorney, Agent, or Firm*—Kanesaka Berner & Partners (57) ABSTRACT

There is provided a technique for improving the efficiency of a generation system of a series hybrid electric vehicle The series hybrid electric vehicle is composed of: an engine; an n-phase generator driven by the engine; a rectifier generating a DC voltage from an n-phase AC voltage received from the n-phase generator; a battery charged with the DC voltage generated; a motor driving drive wheels; an inverter driving the motor on the DC voltage received from the rectifier and/or a DC voltage supplied from the battery; and a switch. The n-phase generator has n armature windings each having one end connected to a common neutral point. The rectifier has a negative terminal, a positive terminal on which a higher potential is generated than on the negative terminal, and n rectifying arms. Each of the n rectifying arms includes; a first diode connected between an intermediated node connected to the other end of the corresponding armature windings and the negative terminal; and a second diode connected between the intermediate node and the positive terminal. The switch is connected between the neutral point and the negative terminal.

8 Claims, 6 Drawing Sheets

U.S. PATENT DOCUMENTS

| | | | |
|---|---|---|---|
| 4,924,130 | A | 5/1990 | Fratta |
| 5,097,166 | A | 3/1992 | Mikulic |
| 5,177,460 | A * | 1/1993 | Dhyanchand et al. ......... 336/12 |
| 5,510,662 | A | 4/1996 | Tanimoto |
| 5,545,928 | A * | 8/1996 | Kotani ..................... 290/40 C |
| 5,672,926 | A | 9/1997 | Brandes |
| 5,675,222 | A * | 10/1997 | Fliege ....................... 318/139 |
| 5,804,947 | A * | 9/1998 | Nii et al. ....................... 322/16 |
| 5,811,904 | A | 9/1998 | Tajima |
| 5,915,488 | A * | 6/1999 | Fliege ....................... 180/65.2 |
| 6,034,458 | A | 3/2000 | Uetake |
| 6,034,459 | A | 3/2000 | Uetake |
| 6,239,525 | B1 | 5/2001 | Matsunobu |
| 6,713,889 | B2 * | 3/2004 | Dietz et al. .............. 290/40 C |
| 6,759,832 | B2 * | 7/2004 | Minamiura et al. ......... 320/150 |
| 6,812,670 | B2 * | 11/2004 | Minamiura et al. ......... 320/116 |
| 6,877,578 | B2 * | 4/2005 | Li et al. ..................... 180/243 |

FOREIGN PATENT DOCUMENTS

| | | | |
|---|---|---|---|
| JP | 52106414 | A | 9/1977 |
| JP | 54077909 | A | 6/1979 |
| JP | 3037000 | A | 2/1991 |
| JP | 4322105 | A | 11/1992 |
| JP | 05-076146 | A | 3/1993 |
| JP | 05-236687 | A | 9/1993 |
| JP | 05-304743 | A | 11/1993 |
| JP | 06-156064 | A | 6/1994 |
| JP | 08-182105 | A | 7/1996 |
| JP | 08-331823 | A | 12/1996 |
| JP | 08-331883 | A | 12/1996 |
| JP | 09-191683 | A | 7/1997 |
| JP | 09-201065 | A | 7/1997 |
| JP | 09-285088 | A | 10/1997 |
| JP | 10-023724 | A | 1/1998 |
| JP | 10-126985 | A | 1/1998 |
| JP | 10-262359 | A | 9/1998 |
| JP | 10313505 | A | 11/1998 |
| JP | 11-004553 | A | 1/1999 |
| JP | 11-027879 | A | 1/1999 |
| JP | 11-089133 | A | 3/1999 |
| JP | 11-089134 | A | 3/1999 |
| JP | 11-089135 | A | 3/1999 |
| JP | 11-089136 | A | 3/1999 |
| JP | 11-089137 | A | 3/1999 |
| JP | 11-089145 | A | 3/1999 |
| JP | 11-098791 | A | 4/1999 |
| JP | 11-136892 | A | 5/1999 |
| JP | 11-196544 | A | 7/1999 |
| JP | 11-206049 | A | 7/1999 |
| JP | 11-243653 | A | 9/1999 |
| JP | 11-275784 | A | 10/1999 |
| JP | 11-285185 | A | 10/1999 |
| JP | 11-285186 | A | 10/1999 |
| JP | 11-346497 | A | 12/1999 |
| JP | 2000-069784 | A | 3/2000 |
| JP | 2000-069788 | A | 3/2000 |
| JP | 2000-078784 | A | 3/2000 |
| JP | 2000-125489 | A | 4/2000 |
| JP | 2000-125490 | A | 4/2000 |
| JP | 2000-134978 | A | 5/2000 |
| JP | 2000-152569 | A | 5/2000 |
| JP | 2000-152682 | A | 5/2000 |
| JP | 2000-152684 | A | 5/2000 |
| JP | 2000-175389 | A | 6/2000 |
| JP | 2000-197386 | A | 7/2000 |
| JP | 2000-217286 | A | 8/2000 |
| JP | 2000-228890 | A | 8/2000 |
| JP | 2001145395 | A | 5/2001 |
| JP | 2002-153033 | A | 5/2002 |
| JP | 2003-199273 | A | 7/2003 |
| JP | 2003-284274 | A | 10/2003 |
| RU | 2022824 | A | 11/1994 |
| RU | 94021358 | A | 8/1996 |

* cited by examiner

SERIES HYBRID ELECTRIC VEHICLE

RELATED APPLICATIONS

The present application is a National Phase entry of International Application Number PCT/JP2005/000189, filed Jan. 11, 2005, which claims priority from, Japanese Application Number 2004-006047, filed Jan. 13, 2004, the disclosure of which is hereby incorporated by reference herein in its entirety.

TECHNICAL FIELD

The present invention is related to series hybrid electric vehicles, more particularly to a technique for improving energy efficiency of series hybrid electric vehicles.

BACKGROUND ART

The series hybrid electric vehicle designates an electric vehicle configured to drive an electric generator by an engine, to supply electric power from the electric generator to a motor, and to drive wheels by the motor, as disclosed in Japanese Laid Open Patent Application JP-A-Heisei, 4-322105, for example. In a series hybrid electric vehicle, the engine is dedicated to the electric generation, and the motive energy generated by the engine is not mechanically transmitted to the drive wheels, differently from a parallel hybrid electric vehicle An advantage of the series hybrid electric vehicle lies in that the series hybrid electric vehicle ideally has high energy efficiency. The drive train mechanism in the parallel hybrid electric vehicle is complicated, since both of the engine and the motor are mechanically connected to the drive wheels. A complicated drive train mechanism may cause the loss of the energy. On the contrary, the drive train mechanism of the series hybrid electric vehicle can be simplified. The simplification of the drive train mechanism is effective for minimize the loss, and reducing the weight. Therefore, the series hybrid electric vehicle is excellent in the ideal energy efficiency.

In order to make good use of the foregoing advantage, the series hybrid electric vehicle is required to ultimately improve the energy efficiency. The use of a mechanism that decreases the energy efficiency is not preferred, because it loses the advantage of the series hybrid electric vehicle.

The first point in the improvement of the energy efficiency of the series hybrid electric vehicle is the loss in the electric generation system. The electric generation system is typically provided with an electric generator and an inverter for converting an alternating voltage generated by the electric generator into a direct voltage. It is difficult to avoid some loss, since the inverter is composed of switching transistors. Typically, the loss of an inverter is about 5%. However, the loss of 5% in the inverter is of importance in the series hybrid electric vehicle, where the energy efficiency is emphasized.

The second point is improvement in the efficiency of the drive system. In the series hybrid electric vehicle where the high energy efficiency is requested, the losses of a transmission mechanism and a differential mechanism are also unignorable. The series hybrid electric vehicle is required to employ a drive system that avoids the losses in the transmission mechanism and the differential mechanism.

Therefore, there is a need for providing a technique for improving the energy efficiency of a series hybrid electric vehicle, more specifically, for further improving the efficiencies of an electric generation system and a drive system within a series hybrid electric vehicle.

DISCLOSURE OF INVENTION

An object of the present invention is generally to improve the energy efficiency of a series hybrid electric vehicle.

In detail, an object of the present invention is to improve the energy efficiency of the electric generation system of a series hybrid electric vehicle.

Another object of the present invention is to improve the energy efficiency of the drive system of a series hybrid electric vehicle.

In an aspect of the present invention, a series hybrid electric vehicle is composed of an engine; an n-phase generator driven by the engine; a rectifier generating a direct voltage from an n-phase alternating voltage received from the n-phase generator; a battery charged up with the generated direct voltage; a motor driving a drive wheel; an inverter driving the motor on the direct voltage received from the rectifier and/or a direct voltage received from the battery; and a switch The rectifier is provided with n armature windings each having a first end connected to a common neutral point. The rectifier in provided with a negative terminal, a positive terminal having a potential higher than that on the negative terminal, and n rectifying arms. Each of the rectifying arms is composed of a first diode connected between the negative terminal and an intermediate node connected with a second end of the corresponding armature winding, and a second diode connected between the intermediate node and the positive terminal. The switch is connected between the neutral point and the negative terminal.

The series hybrid electric vehicle thus structured uses the rectifier for converting the alternating voltage generated by the n-phase generator into the direct voltage, instead of an inverter. The use of the rectifier effectively improves the energy efficiency of the series hybrid electric vehicle, since the rectifier has higher conversion efficiency than that of the inverter.

The use of the rectifier, however, may cause an increase in the output voltage of the rectifier, that is, the direct voltage applied to the battery, because the rectifier does not have a function of controlling the output voltage. An excessive increase in the direct voltage applied to the battery may cause deterioration of the battery. However, the above-described series hybrid electric vehicle, which has the switch between the neutral point and the negative terminal, can control the output voltage of the rectifier.

Specifically, the switch is responsive to the revolution speed of the engine for electrically connecting or disconnecting the neutral point and the negative terminal. Preferably, the switch connects the neutral point and the negative terminal, the revolution speed of the engine exceeds a first revolution speed and reaches a second revolution speed higher than the first revolution speed. When the revolution speed of the engine is decreased down to the first revolution speed, which is lower than the second revolution speed, the switch disconnects the neutral point from the negative terminal. This avoids the excessive increase in the output voltage of the rectifier, when the revolution speed of the engine is increased.

When the number of phases of the generator and rectifier is three, a star-delta switch mechanism may be used which switches the connections of the armature windings of the three-phase generator between the star connection and the delta connection, instead of the switch. Specifically, the star-delta switch mechanism connects the armature windings in selected one of the star and delta connections in response to the engine revolution. Preferably, the star-delta switch mechanism connects the armature windings in the delta connection, when the revolution speed of the engine exceeds a first revolution speed and reaches a second revolution speed higher than the first revolution speed. When the revolution speed of the engine is decreased down to the first revolution speed, which is lower than the second revolution speed, the star-delta switch mechanism connects the armature windings in the star connection. This avoids the excessive increase in the output voltage of the rectifier, when the revolution speed of the engine is increased.

The above-described series hybrid electric vehicle preferably adopts a drive system which incorporates multiple motors that drives drive wheels, respectively. The drive system such designed eliminates the necessity of a transmission mechanism and a differential mechanism, and thereby improves the efficiency thereof. In order to adopt the above-described structure, however, the motors are required to be small in the size, and large in the output torque. In order to satisfy these requirements, it is preferable that the motors are IPM motors structured as follows: The IPM motors are composed of a rotor coupled to the corresponding drive wheel, a stator having a plurality of slots circumferenced and spaced at constant intervals, and the rotor is composed of a rotor core and permanent magnets constituting field magnets. The rotor has a rotor side face facing the stator, and the permanent magnets have a pole face outward in the radial direction. The permanents magnets are shallowly embedded in the rotor That is, the maximum value x of the distance from a point on the pole faces of the permanent magnets to the rotor side face is adjusted so that the following formulas are satisfied:

$x \leq D/10$, $D = 2\Pi r/n_1$, where r is the radius of the rotor core, and $n_1$, is the number of poles of the field magnets. The IPM motors thus constructed satisfies requirements of the reduced size and the large output torque, and allows the adoption of the above-described drive system in which the motors drive the drive wheels, respectively.

The present invention improves the efficiency of the electric generation system and/or the drive system of the series hybrid electric vehicle, and thereby improves the energy efficiency of the series hybrid electric vehicle.

BEST MODE FOR CARRYING OUT THE INVENTION

FIRST EMBODIMENT

Figure 1:
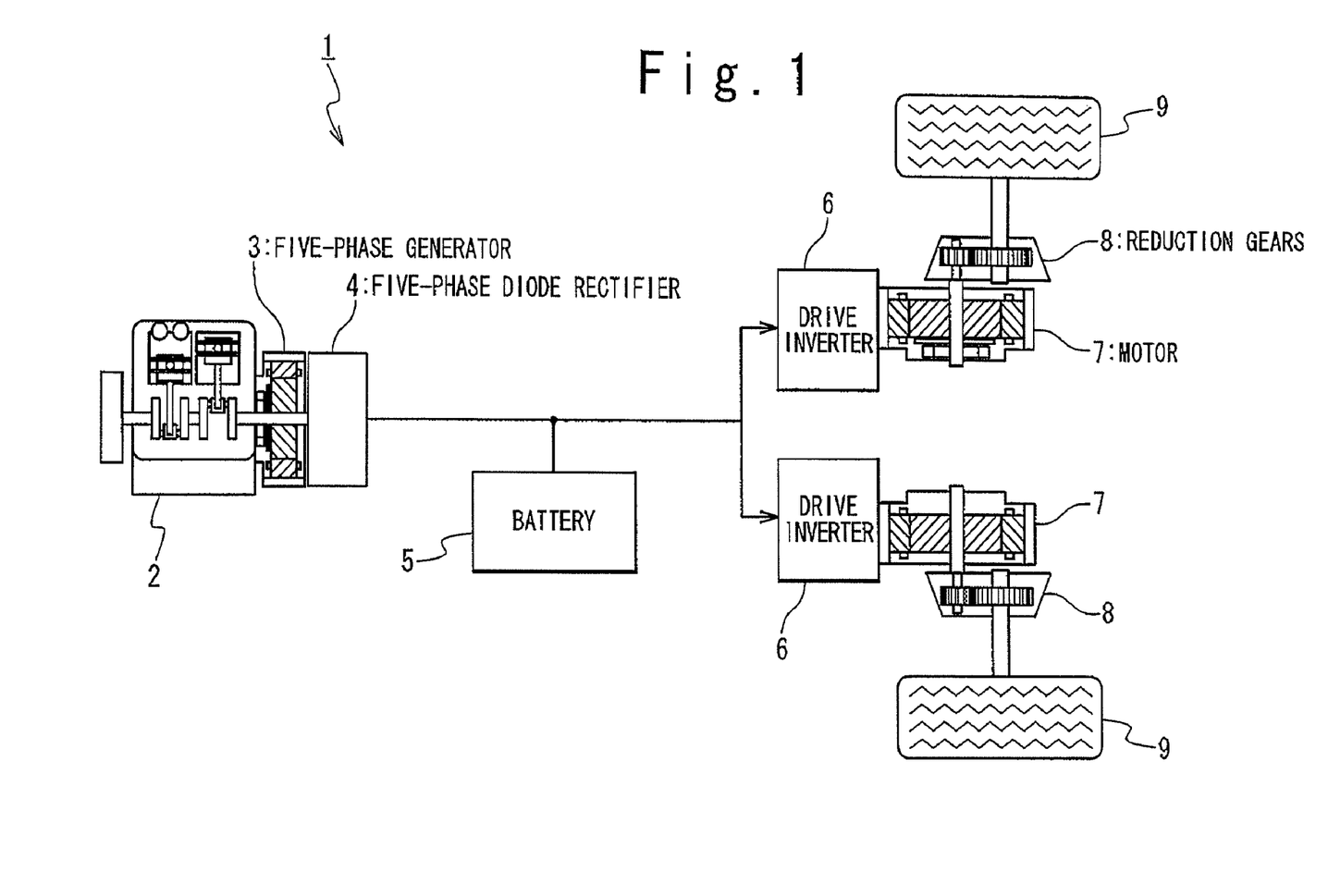
FIG. 1 illustrates a series hybrid electric vehicle in a first embodiment of the present invention.

In a first embodiment of the present invention, as shown in FIG. 1, a series hybrid electric vehicle 1 is provided with an engine 2, a five-phase generator 3, a five-phase diode rectifier 4, and a battery 5. The revolution speed of the engine 2 is controlled by a controller (not shown) The engine 2 is connected to the five-phase generator 3. The five-phase generator 3 is driven by the engine 2 to generate a five-phase alternating voltage, and supplies the generated five-phase alternating voltage to the five-phase diode rectifier 4. The five-phase diode rectifier 4 rectifies the five-phase alternating voltage, and generates a direct voltage. The battery 5 is charged by the direct voltage generated by the five-phase diode rectifier 4.

The series hybrid electric vehicle 1 further includes drive inverters 6, motors 7, reduction gears 8, and drive wheels 9. The drive inverters 6 generate poly-phase electric power from the direct-current power supplied from the five-phase diode rectifier 4 and/or the battery 5. The motors 7 are driven by the generated poly-phase electric power, and generate motive energy. The generated motive energy is transmitted through the reduction gears 8 to the drive wheel 9.

(Structure of Electric Generation System)

Figure 2:
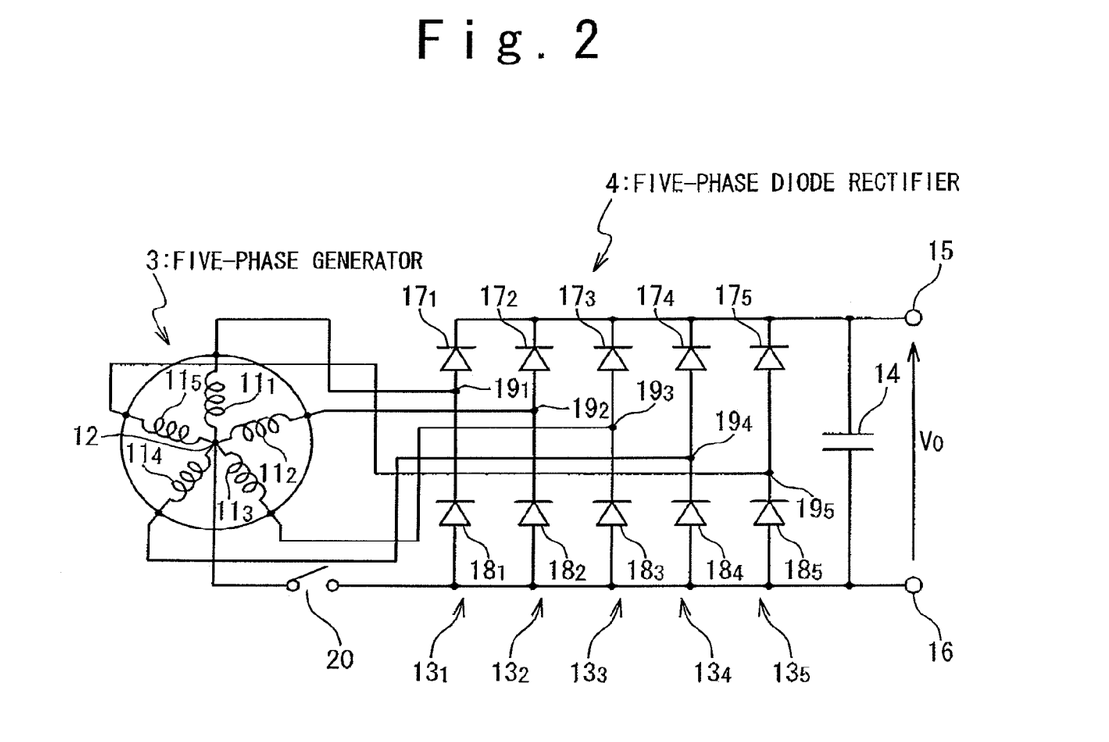
FIG. 2 is a circuit diagram illustrating a structure of a five-phase generator and a five-phase diode rectifier of the series hybrid electric vehicle in the first embodiment.

FIG. 2 is a schematic view illustrating the structure of the five-phase generator 3 and the five-phase diode rectifier 4. The five-phase generator 3 is provided with a rotor (not shown) connected to the engine 2, and a stator provided with five armature windings $11_1$ to $11_5$. First ends of the armature windings $11_1$ to $11_5$ are connected to a neutral point 12. The five-phase diode rectifier 4 is a five-phase full-wave rectifying circuit having five rectifying arms $13_1$ to $13_5$. The five rectifying arms $13_1$ to $13_5$ are connected in parallel between a positive terminal 15 and a negative terminal 16. A direct current output voltage $V_o$ is generated between the positive terminal 15 and the negative terminal 16, and the generated output voltage $V_o$ is supplied to the battery 5 and the drive inverters 6. In order to stabilize the output voltage $V_o$, a smoothing capacitor 14 is connected between the positive terminal 15 and the negative terminal 16. Each rectifying arm $13_i$ includes two series-connected diodes $17_i$ and $18_i$. The cathode of the diode $17_i$ is connected to the positive terminal 15, and the anode thereof is connected to an intermediate node $19_i$. The cathode of the diode $18_i$ is connected to the intermediate node $19_i$, and the anode thereof is connected to the negative terminal 16. The intermediate node $19_i$ of each rectifying arm $13_i$ is connected to the second end (the end opposite to the neutral point 12) of the armature winding $11_i$.

A short-circuit switch 20 is provided between the neutral point 12 of the five-phase generator 3 and the negative terminal 16 of the five-phase diode rectifier 4. When the short-circuit switch 20 is turned on, the neutral point 12 is electrically short-circuited to the negative terminal 16.

One feature of the series hybrid electric vehicle in this embodiment lies in the design which uses the five-phase diode rectifier 4, and thereby excludes an inverter composed of switching transistors. As mentioned above, an inverter composed of switching transistors typically has a loss of 5%. However, the loss of a rectifier is smaller than the loss of an inverter, and therefore the use of a rectifier effectively improves the efficiency of the electric generation system. The five-phase diode rectifier typically achieves an efficiency of 99%.

However, the five-phase diode rectifier 4 does not have a function of adjusting the output voltage $V_o$ by itself. This may cause a problem in charging the battery 5. When the revolution speed of the engine 2 is increased to increase the speed of the series hybrid electric vehicle, the output voltage $V_o$ of the five-phase diode rectifier 4 is also increased. An excessive increase in the output voltage $V_o$ may cause the battery 5 to be excessively charged, which may deteriorate the battery 5.

In order to avoid an excessive increase in the output voltage $V_o$, the foregoing short-circuit switch 20 is turned on, in response to the increase in the revolution speed of the engine 2. The short-circuit switch 20 is turned on, when the revolution speed of the engine 2 exceeds a predetermined first revolution speed $n_1$, and electrically short-circuits the neutral point 12 and the negative terminal 16. Short-circuiting the neutral point 12 and the negative terminal 16 allows the five-phase diode rectifier 4 to be switched from the state in which the five-phase diode rectifier 4 operates as a five-phase full wave rectifying circuit to the state in which the five-phase diode rectifier 4 operates as a five-phase half wave rectifying circuit. This reduces the output voltage $V_o$.

More preferably, the short-circuit switch 20 is turned on in the following procedure. When the revolution speed of the engine 2 is low, the short-circuit switch 20 is turned off. When the controller controlling the revolution speed of the engine 2 detects that the revolution speed of the engine 2 is about to exceed the first revolution speed $n_1$, the revolution speed of the engine 2 is reduced to a third revolution speed $n_3$ by the controller. As a result, the output voltage of the five-phase generator 3 is reduced below the voltage of the battery 5. This results in that the supply of the electric power is terminated from the five-phase generator 3 to the battery 5 and the driving inverter 6. Consequently, the electric power is supplied from only the battery 5 to the driving inverter 6, and the motor 7 is driven by the electric power from the battery 5. Subsequently, the short-circuit switch 20 is turned on, and the revolution speed of the engine 2 is increased to exceed the first revolution speed $n_1$ up to the second revolution speed $n_2$ ($>n_1$) by the controller. After that, the five-phase generator 3 again supplies the electric power to the battery 5 and the driving inverter 6. This procedure avoids the load on the engine 2 being varied abruptly.

When the controller detects that the revolution speed of the engine 2 is reduced from the second revolution speed $n_2$ and is about to reach the first revolution speed $n_1$, on the other hand, the revolution speed of the engine 2 is reduced to a fourth revolution speed $n_4$ lower than the first revolution speed $n_1$. Subsequently, the short-circuit switch 20 is turned off to electrically disconnect the neutral point 12 and the negative terminal 16. The disconnection of the neutral point 12 from the negative terminal 16 allows the five-phase diode rectifier 4 to return to the original state in which the five-phase diode rectifier 4 functions as the five-phase full wave rectifier. After that, the revolution speed of the engine 2 is increased from the fourth revolution speed $n_4$ to the first revolution speed $n_1$, by the controller. This procedure avoids the load on the engine 2 being varied abruptly. Also, the short-circuit switch 20 is not turned off while the electric power is supplied to the battery 5 and the drive inverters 6, and this eliminates the need for the short-circuit switch 20 to be provided with a current shutdown function. This is preferable from the viewpoint of the miniaturization of the short-circuit switch 20. Also, this allows prolonging the lifetime of the short-circuit switch 20, since the short-circuit switch 20 does not shut down the electric power.

As mentioned above, the five-phase diode rectifier 4 is used to improve the energy efficiency, instead of a, inverter in the electric generation system in this embodiment. The problem that the five-phase diode rectifier 4 does not have the function of adjusting the output voltage $V_o$ is avoided by installing the short-circuit switch 20.

In this embodiment, an electric generator and a diode rectifier in which the number of the phases is different from the above-mentioned number, for example, a three-phase electric generator and a three-phase diode rectifier may be used instead of the five-phase generator 4 and the five-phase diode rectifier 5. It should be noted, however, that the use of the five-phase generator 4 and the five-phase diode rectifier 5 is effective for the improvement of the energy efficiency.

(Structure of Drive System)

As shown in FIG. 1, one driving inverter 6 and one set of reduction gears 8 are prepared for each drive wheel 9 in this embodiment. Revolution speeds of the motors 7 are determined so that the series hybrid electric vehicle 1 runs at a desired speed in a desired traveling direction. Such structure eliminates the need of a transmission mechanism and a differential mechanism, and is effective for the improvement of the energy efficiency.

One requirement accompanied by the use of the structure shown in FIG. 1 is that the motors 7 have a reduced size and a sufficiently large output. In order to attain the running performance requested for the vehicle, the motors 7 are required to have a sufficiently large output. However, the series hybrid electric vehicle 1 is allowed to incorporate only small motors 7, because the spaces prepared for the motors 7 is not large. The motors 7 are required to satisfy those conflicting requirements. In the structure of FIG. 7 that requires the plurality of motors 7, the miniaturization of the motor 7 is very important.

Figure 3:
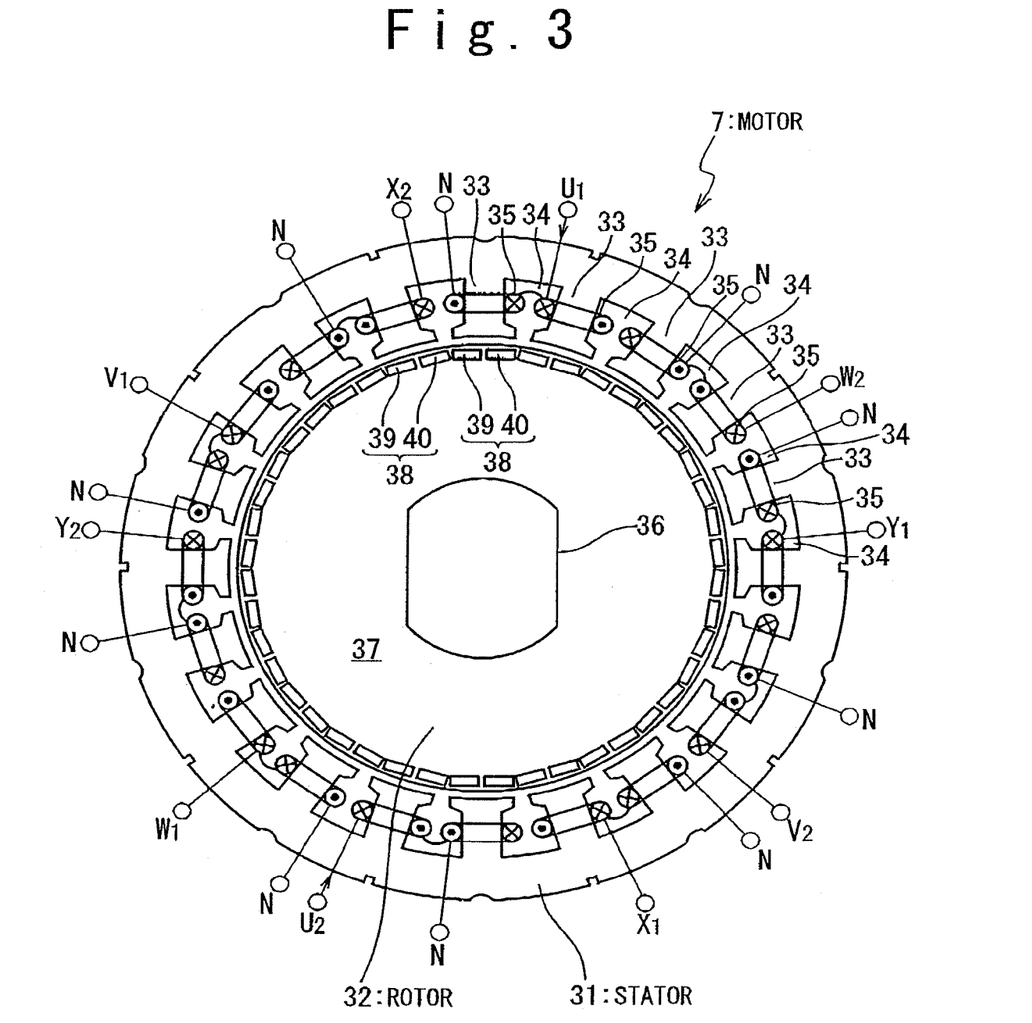
FIG. 3 illustrates a structure of an IPM motor preferable for a drive system of the series hybrid electric vehicle in the first embodiment of the present invention.

In order to satisfy such requirements, it is advantageous that five-phase IPM motors shown in FIG. 3 are used as the motors 7. The five-phase IPM motors 7 are provided with a stator 31 and a rotor 32.

The stator 31 is provided with armature teeth 33.

The armature teeth 33 are arranged on the same circumference and spaced at constant intervals. A slot 34 is formed between the adjacent two armature teeth 33. The slots 34 are arranged on the same circumference at constant intervals. In this embodiment, the number $n_2$ of slots is 20. An armature coil 35 is wound around each of the armature teeth 33. In order to generate a rotating magnetic field in the stator 31, a five-phase armature current is fed to the armature coils 35.

The rotor 32 is provided with a shaft 36 and a rotor core 37. The shaft 36 is rotatably supported by bearings (not shown). The shaft 36 is connected to the above-described reduction gears 8. The rotor core 37 is fixedly coupled to the shaft 36 and is rotated with the shaft 36. The rotor core 37 is made of magnetic material, such as silicon steel plates.

Field magnets 38 are inserted into the rotor iron core 37. Each of the field magnets 38 constitutes one pole of the field magnet system of the rotor 32 and generates magnetic field lines in the radial direction of the rotor 32. The adjacent two field magnets 38 generate the magnetic field lines in the opposite directions. That is, the polarities of the adjacent two field magnets 38 are opposite. In this embodiment, the number of the field magnets 38, namely, the number $n_1$ of the pole of the field magnet system is 22.

Figure 4:
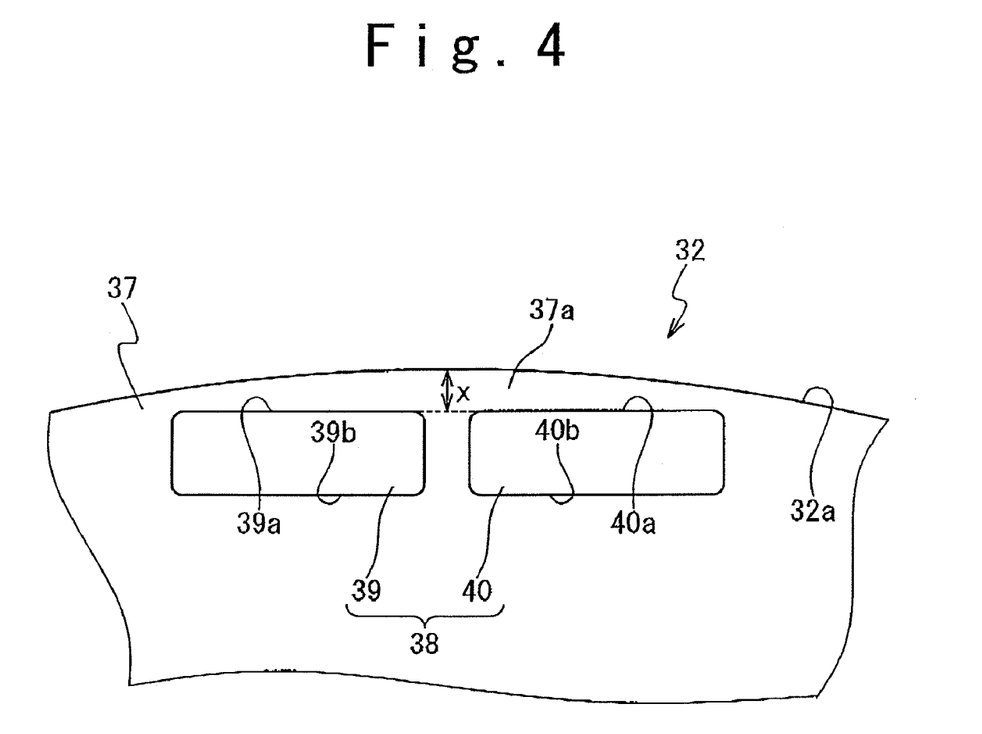
FIG. 4 is an enlarged view of the rotor of the IPM motor shown in FIG. 3.

As shown in FIG. 4, each of the field magnets 38 is composed of two permanent magnets 39 and 40 which are arranged in the circumferential direction of the rotor 32 and have the same polarity. That is, each pole of the field magnet system is composed of the two permanent magnets 39 and 40. The permanent magnets 39 and 40 have magnetic pole faces 39a and 40a facing outward in the radial direction of the rotor 32, and have magnetic pole faces 39b and 40b facing inward in the radius direction. The magnetic field lines generated by the permanent magnets 39 and 40 are emitted in the radius directions from the magnetic pole faces 39a, 39b, 40a and 40b. One set of the permanent magnets 39 and 40 within one field magnet 38 generates the magnetic field lines in the same directions, namely, has the same polarity. It should be noted that the number of the permanent magnets constituting the field magnet 38 of one pole is not limited to 2; the number of the permanent magnets may be one, or three or more.

Portions 17a (magnetic field lines inducing portions 37a) located outside in the radius directions of the permanent magnets 39 and 40 are prepared for the rotor iron core 37. The existence of the magnetic field lines inducing portions 37a is important for generating a reluctance torque, and achieving the weak field control. The volume of the magnetic field lines inducing portions 37a is selected so as to obtain a desirable reluctance torque and to achieve the weak magnetic field control.

Differently from typical IPM motors, the embedding depth of the permanent magnets 39 and 40 from the rotor side face 32a (namely, the distance from a point on the magnetic pole faces 39a and 40a outward in the outward radial direction to the rotor side face 32a) is shallow in the IPM motors 7 shown in FIG. 3. Quantitatively, the permanent magnets 39 and 40 are embedded at the shallow positions so that the maximum value x of the embedding depth satisfies the following equation:

$$x \leq D/10,$$

$$D = 2\Pi r/n_1,$$

where r is the radius of the rotor 32, and $n_1$ is the number of the poles of the rotor 32.

The shallow embedding depth increases the ratio of the component of the magnet torque in the output torque outputted from the IPM motors 7. Differently from typical IPM motors, the magnet torque is the main component of the output torque of the IPM motors 7 shown in FIG. 3; the reluctance torque is the auxiliary component.

The shallow embedding depth of the permanent magnets 39 and 40 is important for increasing the output torque per volume of the IPM motors 7. The shallow embedding depth of the permanent magnets 39 and 40 reduces the quadrature axis inductance. Generally, the reduction in the quadrature axis inductance may be considered to reduce the output torque of the IPM motor; however, this does not hold in the case when the embedding depth of the permanent magnets 39 and 40 is shallow. The shallow embedding depth of the permanent magnets 39 and 40 results in that the magnet torque component out of the output torques of the IPM motors 7 is larger than the reluctance torque component. In such a case, the effect of the increase in the armature current due to the reduction in the quadrature axis inductance, and the resulting increase in both of the magnet and reluctance torques is rather dominant than the effect of the reduction in the reluctance torque resulting from the reduction in the quadrature axis inductance.

On the other hand, the existence of the magnetic field lines inducing portions 37a is important for achieving the weak magnetic field control. A high output torque can be outputted due to the weak magnetic field control, even when the revolution speed of the rotor 32 is high.

As thus described, the use of the structure in which the embedding depth of the permanent magnets 39 and 40 is shallow achieves an increased output torque per volume over a wide revolution speed range. This implies that the IPM motors 7 satisfy the requirements of the small size and the large output. The IPM motors 7 having such characteristics are preferably used to drive the drive wheels 9 in the mechanism shown in FIG. 1

As explained above, the series hybrid electric vehicle in this embodiment does not require a transmission mechanism nor a differential mechanism, through preparing one drive inverter 6, one motor 7, and one set of reduction gears 8 for each drive wheel 9. Therefore, the energy efficiency of the drive system driving the drive wheels 9 is improved. Although the use of such structure is accompanied by the requirements of the reduced size and the increased output on the motors 7, these requirements can be satisfied by using the IPM motor shown in FIG. 3 as the motor 7, in which the embedding depth of the permanent magnets is shallow.

SECOND EMBODIMENT

Figure 5:
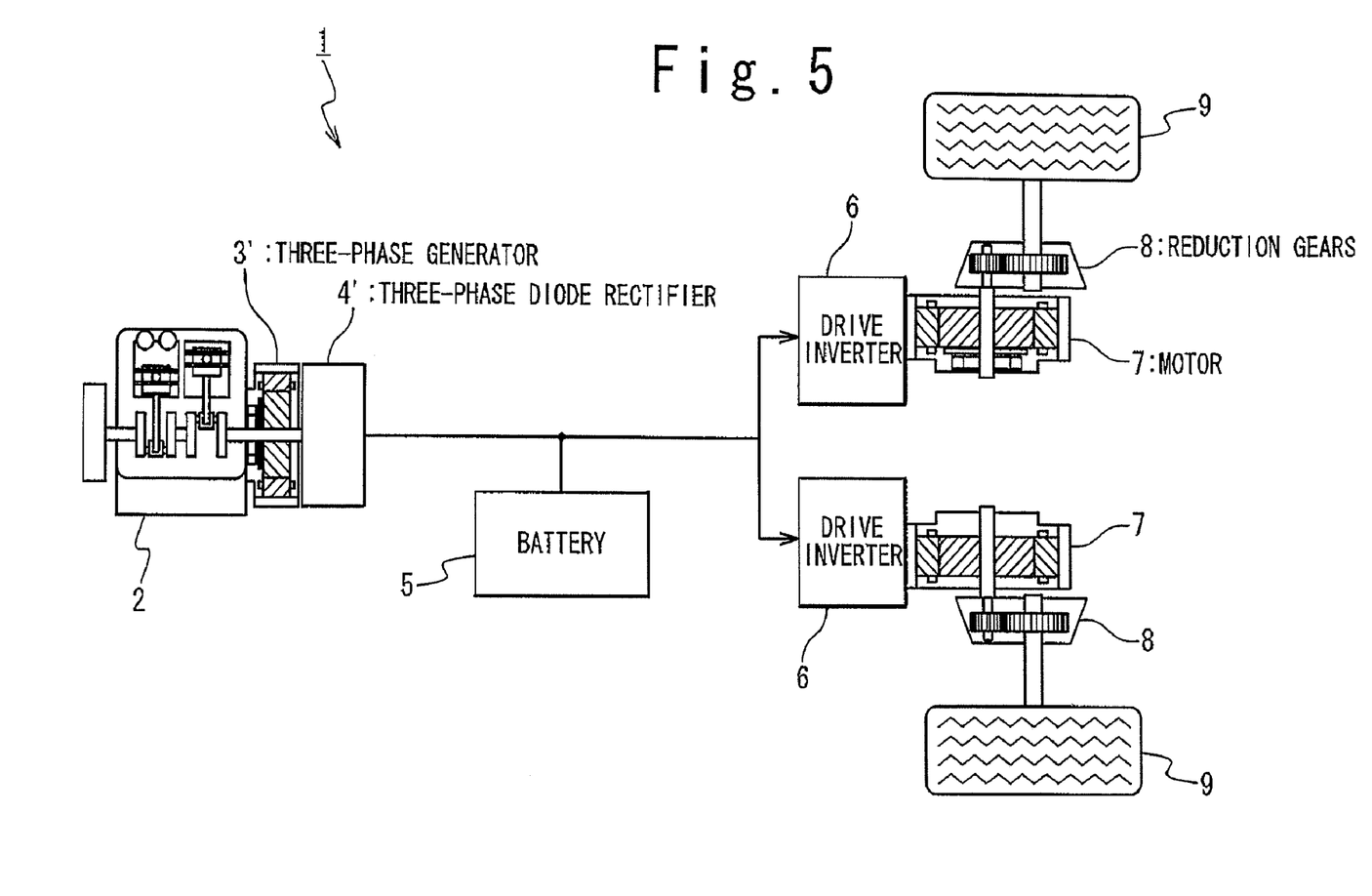
FIG. 5 illustrates a series hybrid electric vehicle in a second embodiment of the present invention.

In a second embodiment of the present invention, as shown in FIG. 5, a three-phase electric generator 3' is used in place of the five-phase generator 3, and a three-phase diode rectifier 4' is used in place of the five-phase diode rectifier 4. The three-phase diode rectifier 4' has the same configuration as the five-phase diode rectifier 4, except for that the number of the phases is different (namely, the number of the rectifying arms is different).

As mentioned above, the proper adjustment of the output voltage $V_o$ outputted from the three-phase diode rectifier 4' is important for protecting the battery 5. Similarly to the five-phase diode rectifier 4 of the first embodiment, a mechanism for adjusting the output voltage $V_o$ is separately required, since the three-phase diode rectifier 4' does not have the adjusting function for the output voltage $V_o$, by itself.

Prepared in this embodiment is a switching mechanism for switching the connections of the armature windings of the three-phase electric generator 3' between the star connection and the delta connection, instead of the short-circuit switch 20. This allows the output voltage $V_o$ outputted from the three-phase diode rectifier 4' to be adjusted.

Figure 6:
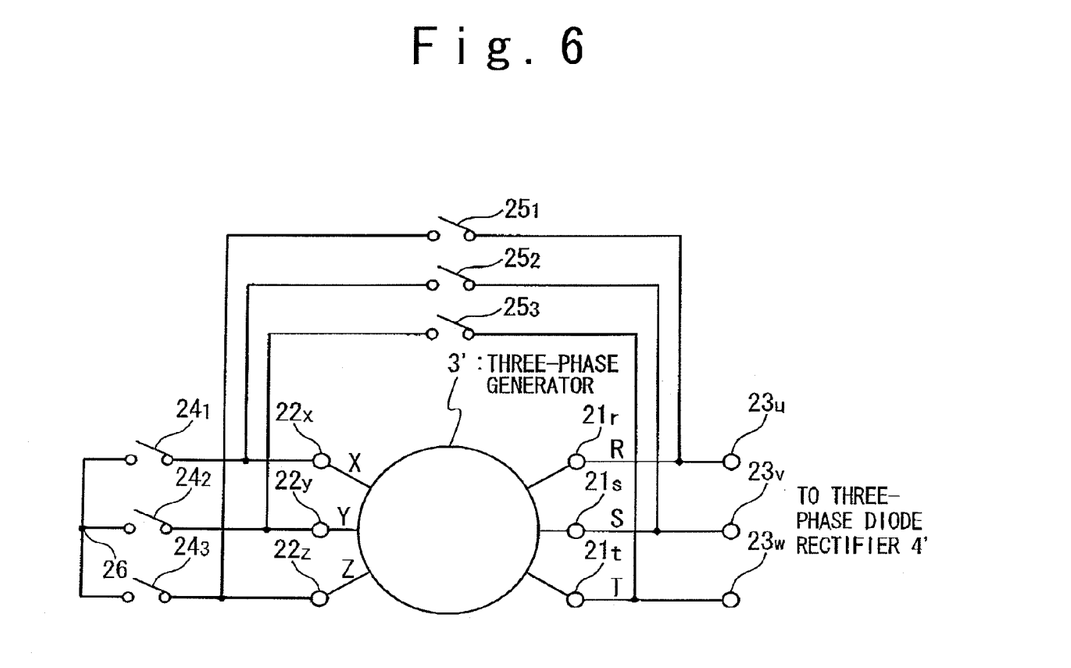
FIG. 6 is a circuit diagram illustrating a structure of a three-phase generator of the series hybrid electric vehicle in the second embodiment.

FIG. 6 schematically illustrates the structures of the three-phase electric generator 3' and the switching mechanism for switching the connections therein. The three-phase electric generator 3' has an R-phase terminal 21r, an S-phase terminal 21s, a T-phase terminal 21t, an X-terminal 22x, a Y-terminal 22y and a Z-terminal 22z. One armature winding out of the three armature windings (none of them is shown) in the three-phase electric generator 3' is provided between the R-phase terminal 21r and the X-terminal 22x, and another armature winding is provided between the S-phase terminal 21s and the Y-terminal 22y, and the remaining one armature winding is provided between the T-phase terminal 21t and the Z-terminal 22z. The R-phase terminal 21r, the S-phase terminal 21s and the T-phase terminal 21t are connected to a U-phase terminal 23u, a V-phase terminal 23v and a W-phase terminal 23w, respectively. The three-phase electric generator 3' supplies a three-phase alternating voltage through the U-phase terminal 23u, the V-phase terminal 23v and the W-phase terminal 23w to the three-phase diode rectifier 4'.

The switching mechanism is composed of star switches $24_1$ to $24_3$, and delta switches $25_1$ to $25_3$. The star switches $24_1$, $24_2$, and $24_3$ are disposed to connect a neutral point 26 to the X-terminal 22x, the Y-terminal 22y and the Z-terminal 22z, respectively. The delta switch $25_1$ is connected between the Z-terminal 22z and the U-phase terminal 23u, the delta switch $25_2$ is connected between the X-terminal 22x and the V-phase terminal 23v, and the delta switch 253 is connected between the Y-terminal 22y and the W-phase terminal 23w.

In this embodiment, the three-phase alternating voltage outputted from the three-phase electric generator 3' is adjusted through the turn-on and turn-off of the star switches $24_1$ to $24_3$ and the delta switches $25_1$ to $25_3$, and thereby the output voltage $V_o$ of the three-phase diode rectifier 4' is also adjusted. This avoids an excessive charging of the battery 5 due to the increase in the revolution speed of the engine 2. The operations of the star switches 24₁ to 24₃ and the delta switches 25₁ to 25₃ will be described below in detail.

When the revolution speed of the engine 2 is low, the star switches 24₁ to 24₃ are turned on, and the delta switches 25₁ to 25₃ are turned off. As a result, the armature windings of the three-phase electric generator 3' are star-connected.

When the revolution speed of the engine 2 exceeds a predetermined first revolution speed $n_1$, the star switches 24₁ to 24₃ are turned off, and the delta switches 25₁ to 25₃ are turned on. This results in that the armature windings of the three-phase electric generator 3' are switched from the star connection to the delta connection. Switching the armature windings of the three-phase electric generator 3' to the delta connection reduces the inter-phase voltages of the three-phase alternating voltages among the U-phase terminal 23*u*, the V-phase terminal 23*v* and the W-phase terminal 23*w* to $1/\sqrt{3}$ times. This reduces the output voltage $V_o$ of the three-phase diode rectifier 4'.

It is more preferable that the switching from the star connection to the delta connection is carried out as follows. When the revolution speed of the engine 2 is low, the armature windings of the three-phase electric generator 3' are star-connected. That is, the delta switches 251 to 253 are turned off, and the star switches 24₁ to 24₃ are turned on. When the controller for controlling the revolution speed of the engine 2 detects that the revolution speed of the engine 2 is about to exceed the first revolution speed $n_1$, the revolution speed of the engine 2 is reduced to a third revolution speed $n_3$ by the controller. As a result, the output voltage of the three-phase electric generator 3' is reduced below the voltage of the battery 5. This results in that the electric power is not supplied from the three-phase electric generator 3' to the battery 5 and the drive inverters 6. At this time, the electric power is supplied from only the battery 5 to the driving inverter 6, and the motors 7 are driven by the electric power from the battery 5. Subsequently, the armature windings of the three-phase electric generator 3' are switched to the delta connection. Additionally, the controller increases the revolution speed of the engine 2 to exceed the first revolution speed $n_1$ up to a second revolution speed $n_2$ (>n1) After that, the three-phase electric generator 3' again supplies the electric power to the battery 5 and the drive inverters 6. This procedure avoids the load on the engine 2 being varied abruptly.

When the controller detects that the revolution speed of the engine 2 is reduced from the second revolution speed $n_2$, and is about to reach the first revolution speed $n_1$, on the other hand, the revolution speed of the engine 2 is reduced to a fourth revolution speed $n_4$ lower than the first revolution speed $n_1$. Subsequently, the armature windings of the three-phase electric generator 3' are switched from the delta connection to the star connection. That is, the star switches 24₁ to 24₃ are turned on, and the delta switches 25₁ to 25₃ are turned off. After that, the controller increases the revolution speed of the engine 2 from the fourth revolution speed $n_4$ to the first revolution speed $n_1$. This procedure avoids the load on the engine 2 being varied abruptly. Also, the star switches 24₁ to 24₃ and the delta switches 25₁ to 25₃ are not turned off, while the electric power is supplied to the battery 5 and the drive inverters 6. Therefore, these switches are not required to be provided with the current shutdown function. This is preferable from the viewpoint of the miniaturization of the switches. Additionally, it is possible to prolong the lifetime of the star switches 24₁ to 24₃ and the delta switches 25₁ to 25₃, since these switches do not shut down the electric power.

As mentioned above, the three-phase diode rectifier 4' is used instead of an inverter, in the electric generation system in this embodiment, which improves the energy efficiency. The problem that the five-phase diode rectifier 4' does not have the adjusting function for the output voltage $V_o$ is avoided by the fact that the connections of the armature windings of the three-phase electric generator 3' are switchable between the star connection and the delta connection.

The invention claimed is:

1. A series hybrid electric vehicle comprising:
   an engine;
   an n-phase generator driven by said engine;
   a rectifier generating a direct voltage from an n-phase alternating voltage received from said n-phase generator;
   a battery charged with said direct voltage;
   a motor driving a drive wheel;
   an inverter driving said motor on said direct voltage received from said rectifier and/or a direct voltage received from said battery;
   a switch,
   wherein said n-phase generator includes n armature windings each having a first end connected to a common neutral point,
   wherein said rectifier includes:
      a negative terminal;
      a positive terminal on which a higher potential is generated than on said negative terminal; and
      n rectifying arms,
   wherein each of said n rectifying arms comprises:
      a first diode connected between said negative terminal and an intermediate node connected to second end of corresponding one of said n armature windings; and
      a second diode connected between said intermediate node and said positive terminal, and
   wherein said switch is connected between said neutral point and said negative terminal.

2. The series hybrid electric vehicle according to claim 1, wherein said switch electrically connects or disconnects said neutral point and said negative terminal in response to a revolution speed of said engine.

3. The series hybrid electric vehicle according to claim 2, further comprising a controller controlling the engine revolution speed of said engine,
   wherein, when said engine revolution speed is about to exceed a first revolution speed, said controller decreases said engine revolution speed down to a third revolution speed lower than said first revolution speed, and said switch electrically connects said neutral point and said negative terminal, and then said controller increases said engine revolution speed up to a second revolution speed higher than said first revolution speed.

4. The series hybrid electric vehicle according to claim 3, wherein, when said engine revolution speed is decreased from said second revolution speed and is about to reach said first revolution speed, said controller decreases the revolution speed of said engine down to a fourth revolution speed lower than said first revolution speed, and said switch electrically disconnects said neutral point and said negative terminal, and then said controller increases said engine revolution speed up to said first revolution speed.

5. The series hybrid electric vehicle according to claim 1, wherein said wheels and said motors are plurally prepared,
   wherein said motors drives said drive wheels, respectively,
   wherein each of said motors includes:
      a rotor connected to a corresponding one of said drive wheels;
      a stator having a plurality of slots circumferenced and spaced at constant intervals, wherein said rotor comprises:
a rotor core; and
permanent magnets constituting a field magnet system,
wherein said rotor has a rotor side face facing said stator,
wherein said permanent magnets have a pole face outward in a radial direction of said rotor;
wherein a maximum value x of a distance from a point on said pole face to said rotor side face satisfies the following equation:

$x \leq D/10$, and $D = 2\Pi r/n_1$, where r is a radius of said rotor core, and n1 is a number of poles of said field magnet system.

6. A series hybrid electric vehicle comprising:
an engine;
a three-phase generator driven by said engine;
a rectifier generating a direct voltage from a three-phase voltage received from said three-phase generator;
a battery charged with said direct voltage;
a motor driving a drive wheel;
an inverter driving said motor on said direct voltage received from said rectifier and/or a direct voltage received from said battery; and
a star-delta switch mechanism,
wherein said three-phase generator includes three armature windings, and
wherein said star-delta switching mechanism connects said armature windings in selected one of a star connection and a delta connection,
wherein said star-delta switch mechanism is responsive to a revolution speed of said engine for connecting said armature windings in selected one of said star connection and said delta connection, and
a controller controlling the engine revolution speed of said engine,
wherein, when the revolution speed of said engine is about to exceed a first revolution speed, said controller decreases said engine revolution speed down to a third revolution speed lower than said first revolution speed, and said star-delta switch mechanism connects said armature windings in said delta connection, and then said controller increases said engine revolution speed up to a second revolution speed higher than said first revolution speed.

7. The series hybrid electric vehicle according to claim 6, wherein, when said engine revolution speed is decreased from said second revolution speed and is about to reach said first revolution speed, said controller decreases the revolution speed of said engine down to a fourth revolution speed lower than said first revolution speed, and said star-delta switch mechanism connects said armature windings in said star connection, and then said controller increases said engine revolution speed up to said first revolution speed.

8. A series hybrid electric vehicle comprising:
an engine;
a three-phase generator driven by said engine;
a rectifier generating a direct voltage from a three-phase voltage received from said three-phase generator;
a battery charged with said direct voltage;
a motor driving a drive wheel;
an inverter driving said motor on said direct voltage received from said rectifier and/or a direct voltage received from said battery; and
a star-delta switch mechanism,
wherein said three-phase generator includes three armature windings, and
wherein said star-delta switching mechanism connects said armature windings in selected one of a star connection and a delta connection,
wherein said drive wheels and said motors are plurally prepared,
wherein said motors drives said drive wheels, respectively,
wherein each of said motors includes:
a rotor connected to a corresponding one of said drive wheels;
a stator having a plurality of slots circumferenced and spaced at constant intervals, wherein said rotor comprises:
a rotor core; and
permanent magnets constituting a field magnet system,
wherein said rotor has a rotor side face facing said stator,
wherein said permanent magnets have a pole face outward in a radial direction of said rotor;
wherein a maximum value x of a distance from a point on said pole face to said rotor side face satisfies the following equation;

$x \leq D/10$, and $D = 2\Pi r/n_1$, where r is a radius of said rotor core, and $n_1$ is a number of poles of said field magnet system.

* * * * *